United States Patent [19]

Frantz

[11] Patent Number: 5,487,288
[45] Date of Patent: Jan. 30, 1996

[54] ANTI-THEFT DEVICE FOR A SPARE TIRE ON A PICK-UP TRUCK

[76] Inventor: Horst A. Frantz, 905 Fairoaks, Garland, Tex. 75040

[21] Appl. No.: 374,896
[22] Filed: Jan. 19, 1995
[51] Int. Cl.$^6$ .......................... B62D 43/04; E05B 65/12
[52] U.S. Cl. .......................... 70/259; 70/230; 224/42.12; 224/42.23; 248/552
[58] Field of Search .................... 70/14, 225, 259, 70/260, 229–231; 224/42.12, 42.13, 42.21, 42.23, 42.25, 42.26; 248/552

[56] References Cited

U.S. PATENT DOCUMENTS

| | | | |
|---|---|---|---|
| 1,612,420 | 12/1926 | Davis | 70/230 |
| 1,650,578 | 11/1927 | Wyman | 70/230 |
| 1,853,476 | 4/1932 | Van Raust | 70/259 |
| 3,425,605 | 2/1969 | Triboulet | 224/42.25 X |
| 3,918,599 | 11/1975 | Porter | 70/259 X |
| 4,132,336 | 1/1979 | Leinaar | 224/42.13 |
| 4,562,707 | 1/1986 | Graham, III | 70/230 X |
| 4,765,164 | 8/1988 | Prince, Jr. | 70/230 X |

FOREIGN PATENT DOCUMENTS

| | | | |
|---|---|---|---|
| 25058 | of 1913 | United Kingdom | 70/230 |
| 265943 | 9/1927 | United Kingdom | 70/259 |

Primary Examiner—Lloyd A. Gall

[57] ABSTRACT

An anti-theft device for a spare tire of a pick-up truck including a rigid locking plate having an upper extent slidably securable to a lower rail of a spare tire locking tongue of a pick-up truck and a lower extent with an eyelet formed thereon; a rigid locking screw disposable within a bore of a lower rail of a spare tire locking tongue of a pick-up truck, the locking screw having an upper end securable to a frame of a pick-up truck and a lower end with a ring formed thereon alignable with the eyelet of the locking plate; and a rigid locking pin having a bore on one end and a head on the other end and with the pin positionable within the eyelet of the locking plate and ring of the locking screw to thereby define a coupled configuration and with a lock insertable within the bore of the locking pin when placed in the coupled configuration for locking the spare tire to a pick-up truck.

5 Claims, 4 Drawing Sheets

ANTI-THEFT DEVICE FOR A SPARE TIRE ON A PICK-UP TRUCK

BACKGROUND OF THE INVENTION

1. Field of the Invention

The present invention relates to an anti-theft device for a spare tire on a pick-up truck and more particularly pertains to preventing theft of a spare tire on a pick-up truck with an anti-theft device for a spare tire on a pick-up truck.

2. Description of the Prior Art

The use of spare tire anti-theft devices is known in the prior art. More specifically, spare tire anti-theft devices heretofore devised and utilized for the purpose of preventing theft of a spare tire on a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,130,227 to Rice discloses a spare wheel and tire locking mount for pick-up trucks. U.S. Pat. No. 4,768,361 to Derman discloses a spare tire locking device. U.S. Pat. No. 5,102,022 to Knezovich discloses a locking device for a spare tire carrier. U.S. Pat. No. 5,211,043 to Langdon discloses a spare tire locking device. U.S. Pat. No. 5,303,569 to Wright discloses a spare tire locking device.

While these devices fulfill their respective, particular objective and requirements, the aforementioned patents do not describe an anti-theft device for a spare tire on a pick-up truck that is simple in design, readily usable with current makes and models of pick-up trucks, and precludes the theft of a spare tire of a pick-up truck.

In this respect, the anti-theft device for a spare tire on a pick-up truck according to the present invention substantially departs from the conventional concepts and designs of the prior art, and in doing so provides an apparatus primarily developed for the purpose of preventing theft of a spare tire on a pick-up truck.

Therefore, it can be appreciated that there exists a continuing need for a new and improved anti-theft device for a spare tire on a pick-up truck which can be used for preventing theft of a spare tire on a pick-up truck. In this regard, the present invention substantially fulfills this need.

SUMMARY OF THE INVENTION

In view of the foregoing disadvantages inherent in the known types of spare tire anti-theft devices now present in the prior art, the present invention provides an improved anti-theft device for a spare tire on a pick-up truck. As such, the general purpose of the present invention, which will be described subsequently in greater detail, is to provide a new and improved anti-theft device for a spare tire on a pick-up truck and method which has all the advantages of the prior art and none of the disadvantages.

To attain this, the present invention essentially comprises, in combination, a rigid spare tire locking tongue formed of a planar upper rail having an upper end, a lower end, and a length greater than a thickness of a spare tire of a pickup truck and with the upper end securable to a frame of a pick-up truck, a rigid planar lower rail having an inboard end and an outboard end and a length greater than a diameter of a spare tire of a pickup truck and with the outboard end having a bore disposed thereon and the inboard end coupled to the lower end of the upper rail with a hinge. The hinge allows the lower rail to be placed in facing contact with a side of a spare tire of a pick-up truck positioned thereabove. A rigid locking plate is included and has an upper extent with a pair of opposed C-shaped locking arms slidably secured to the lower rail and a lower extent with an eyelet formed thereon. A rigid locking screw is included and disposed within the bore of the lower rail of the locking tongue. The locking screw has a threaded upper end threadably securable to a frame of a pick-up truck, a lower end with a ring formed thereon alignable with the eyelet of the locking plate, and a flange formed thereon intermediate the upper and lower ends and positionable in contact with the lower rail of the locking tongue. Lastly, a rigid locking pin is included and has a cylindrical tip end with a bore disposed therethrough, a circular planar head end having a diameter greater than the tip end, and an intermediate cylindrical portion therebetween having a diameter greater than the tip end and less than the head end and with the intermediate portion slidably positioned within the ring of the locking screw and the tip end slidably positioned within the eyelet of the locking screw to thereby define a coupled configuration and with a lock insertable within the bore of the locking pin when placed in the coupled configuration for locking the spare tire to a pick-up truck.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved anti-theft device for a spare tire on a pick-up truck which has all the advantages of the prior art spare tire anti-theft devices and none of the disadvantages.

It is another object of the present invention to provide a new and improved anti-theft device for a spare tire on a pick-up truck which may be easily and efficiently manufactured and marketed.

It is a further object of the present invention to provide a new and improved anti-theft device for a spare tire on a pick-up truck which is of durable and reliable construction.

An even further object of the present invention is to provide a new and improved anti-theft device for a spare tire on a pick-up truck which is susceptible of a low cost of manufacture with regard to both materials and labor, and which accordingly is then susceptible of low prices of sale to the consuming public, thereby making such an anti-theft device for a spare tire on a pick-up truck economically available to the buying public.

Still yet another object of the present invention is to provide a new and improved anti-theft device for a spare tire on a pick-up truck which provides in the apparatuses and methods of the prior art some of the advantages thereof, while simultaneously overcoming some of the disadvantages normally associated therewith.

Even still another object of the present invention is to provide a new and improved anti-theft device for a spare tire on a pick-up truck for preventing theft of a spare tire on a pick-up truck.

Lastly, it is an object of the present invention to provide a new and improved anti-theft device for a spare tire on a pick-up truck comprising a rigid locking plate having an upper extent slidably securable to a lower rail of a spare tire locking tongue of a vehicle and a lower extent with an eyelet formed thereon; a rigid locking screw disposable within a bore of a lower rail of a spare tire locking tongue of a vehicle, the locking screw having an upper end securable to a frame of a vehicle and a lower end with a ring formed thereon alignable with the eyelet of the locking plate; and a rigid locking pin having a bore on one end and a head on the other end and with the pin positionable within the eyelet of the locking plate and ring of the locking screw to thereby define a coupled configuration and with a lock insertable within the bore of the locking pin when placed in the coupled configuration for locking the spare tire to a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
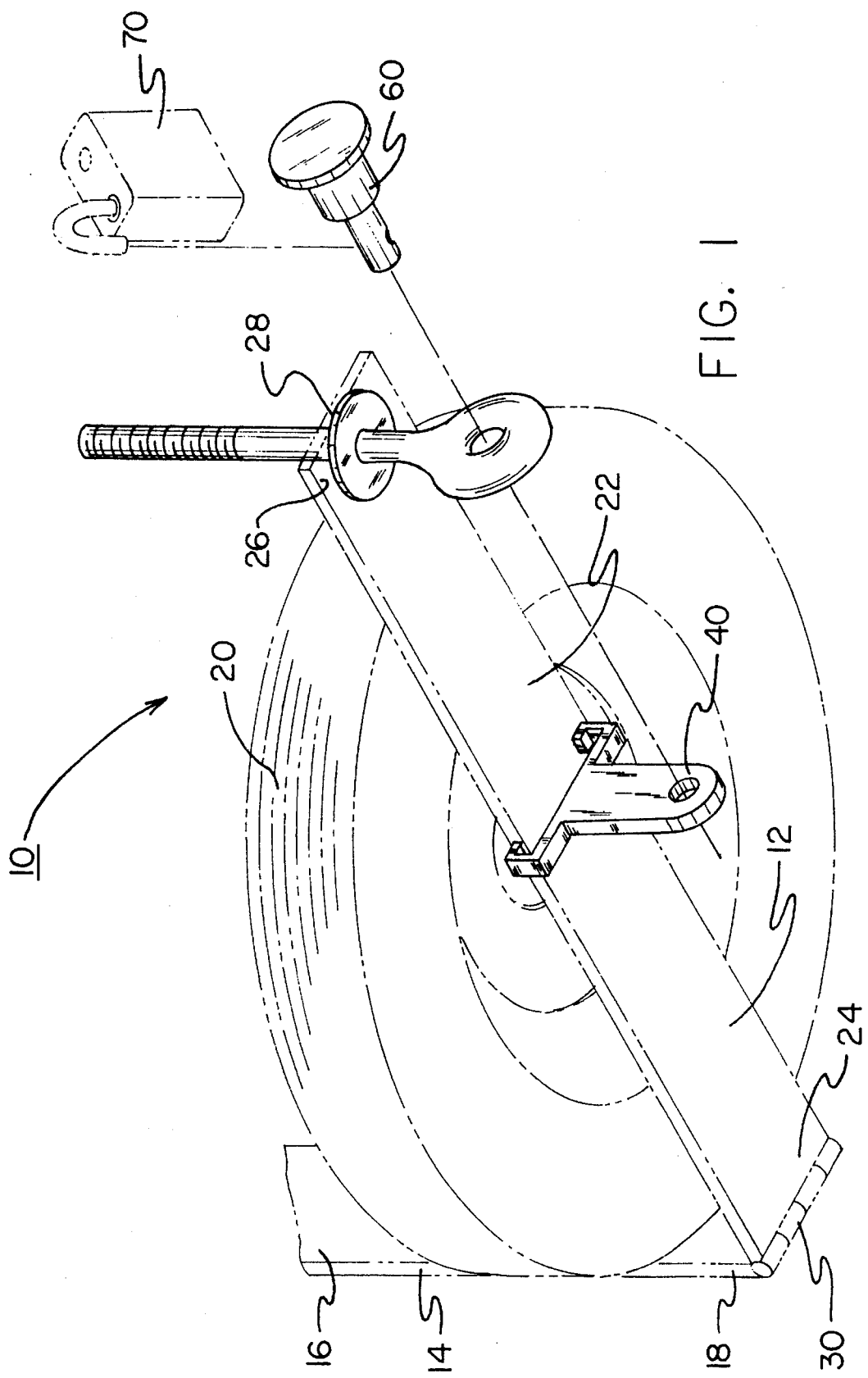
FIG. 1 is a perspective view of the preferred embodiment constructed in accordance with the principles of the present invention.

With reference now to the drawings, and in particular, to FIG. 1 thereof, the preferred embodiment of the new and improved anti-theft device for a spare tire on a pick-up truck embodying the principles and concepts of the present invention and generally designated by the reference number 10 will be described.

The present invention is comprised of a plurality of components. In their broadest context, such components include a locking tongue, locking plate, locking screw, and locking pin. Such components are individually configured and correlated with respect to each other to provide the intended function of locking a spare tire to a pick-up truck.

Specifically, the present invention includes a spare tire locking tongue 12. The spare tire locking tongue is rigid in structure and formed of a hardened steel material. The spare tire locking tongue includes a planar upper rail 14 having an upper end 16, a lower end 18, and a length greater than a thickness of a spare tire 20 of a pick-up truck. The upper end of the upper rail is securable to a frame of a pick-up truck. The spare tire locking tongue also includes a planar lower rail 22. The lower rail has an inboard end 24, an outboard end 26, and a length greater than the diameter of a spare tire of a pick-up truck. The outboard end has a circular bore 28 disposed thereon. The inboard end of the lower rail is coupled to the lower end of the upper rail with a hinge 30. The hinge allows the lower rail to be placed in facing contact with a side of a spare tire of a pick-up truck positioned thereabove. In this position, the spare tire locking tongue is essentially placed in an L-shaped configuration. Each rail of the locking tongue is generally rectangular in structure. The lower rail is longer than the upper rail.

Figure 2:
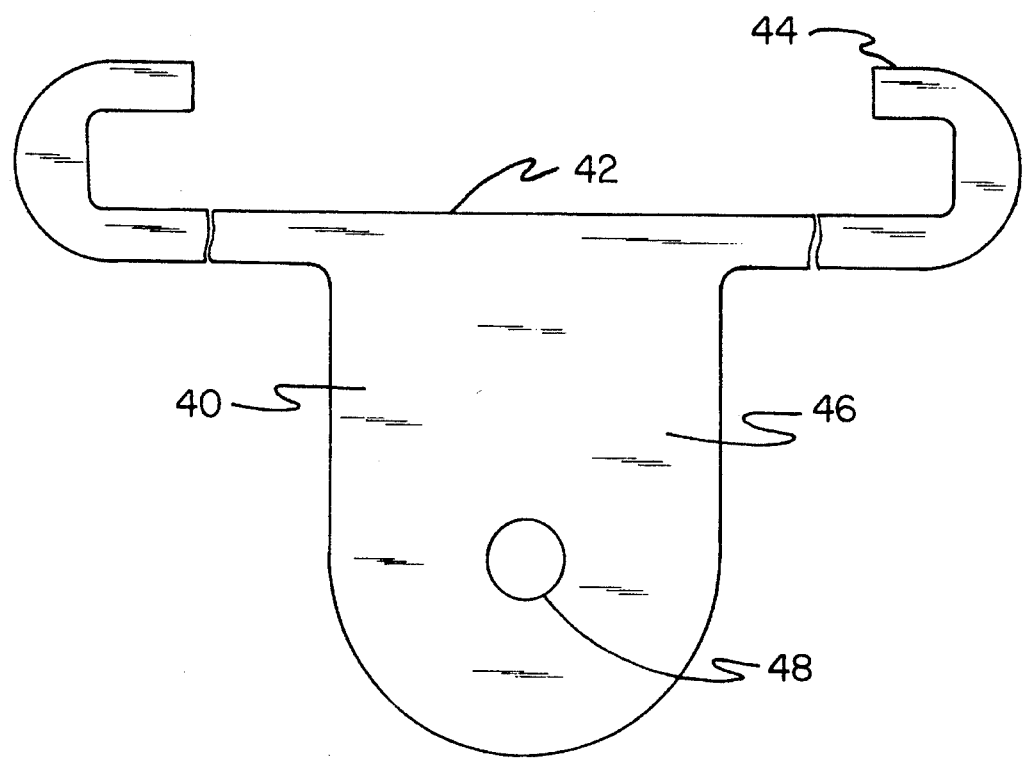
FIG. 2 is a side-elevational view of the locking plate of the present invention.
Figure 3:
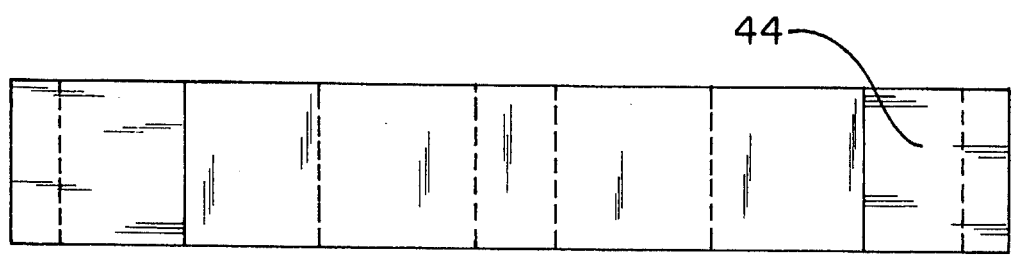
FIG. 3 is a plan view of the locking plate of the present invention.
Figure 4:
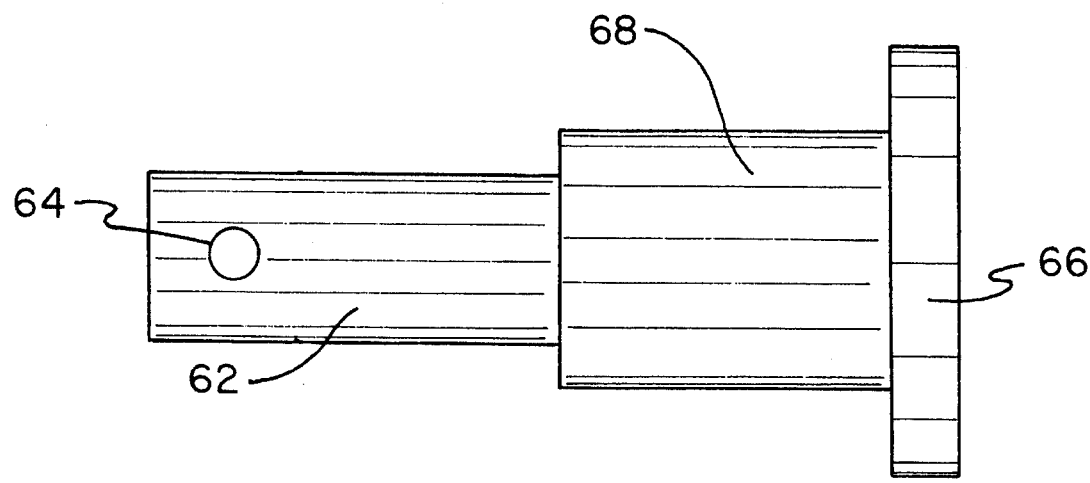
FIG. 4 is a side-elevational view of the locking pin of the present invention.
Figure 5:
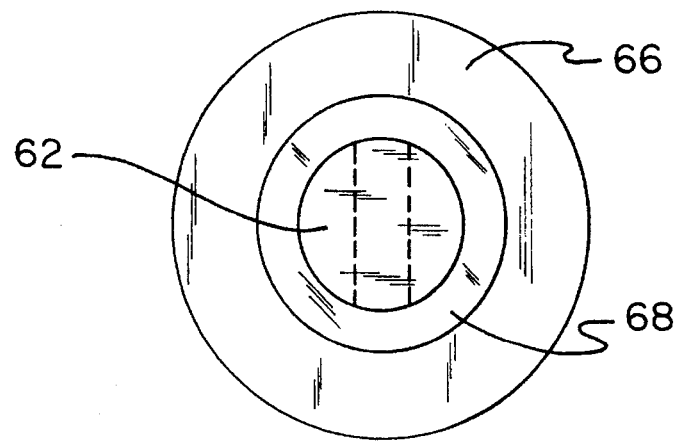
FIG. 5 is a plan view of the locking pin of the present invention.
Figure 6:
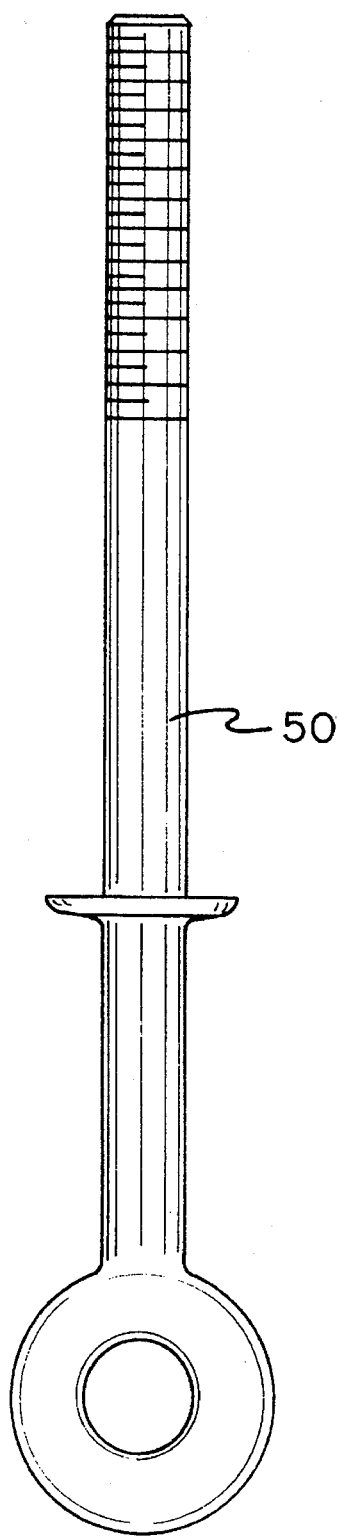
FIG. 6 is a side-elevational view of the locking screw of the present invention.
Figure 7:
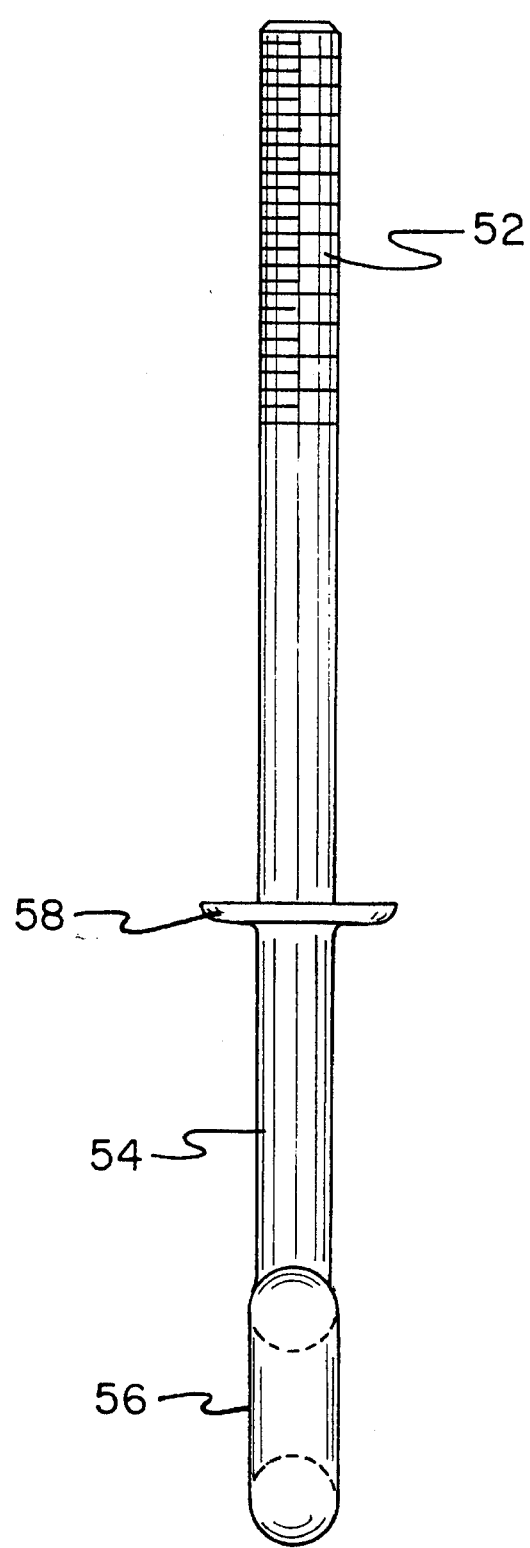
FIG. 7 is yet another side-elevational view of the locking screw of the present invention.

Also provided is a locking plate 40. The locking plate is formed of a rigid hardened steel material. As best illustrated in FIG. 2, the locking plate has an upper extent 42 with a pair of opposed C-shaped locking arms 44 extended therefrom. The locking arms are slidably secured to the lower rail as shown in FIG. 1 for longitudinal movement therealong. Furthermore, the locking plate has a lower extent 46 with an eyelet 48 formed thereon. When the locking tongue 12 is positioned in an L-shaped configuration, the eyelet of the locking plate extends vertically downwards.

Also included is a locking screw 50. The locking screw is formed of a rigid hardened steel material. The locking screw is disposed within the bore 28 of the lower rail 22 of the locking tongue. The locking screw has a threaded cylindrical upper end 52. This upper end is threadably securable within an external threaded bore on a frame of a pick-up truck. Alternatively, the upper end may be secured to the frame of a pick-up truck with a nut. The locking screw also includes a lower end 54 with a ring 56 formed thereon. The ring has a circular aperture with a diametric extent greater than that of the eyelet 48. The ring is alignable with the eyelet 48 of the locking plate. Furthermore, the locking screw includes a flange 58 formed thereon intermediate the upper and lower ends. The flange is positionable in contact with the lower rail 22 of the locking tongue. The flange precludes inadvertent downward extension of the lower rail of the locking tongue.

Lastly, a locking pin 60 is provided. The locking pin is formed of a rigid hardened steel material. The locking pin has a cylindrical tip end 62 with a bore 64 disposed therethrough. Also included as part of the locking pin is a circular planar head end 66. The head end has a diameter greater than the tip end 62 and the circular aperture of the ring 56. An intermediate cylindrical portion 68 is extended between the tip end 62 and the head end 66. The intermediate portion has a diameter greater than the tip end and less than the head end. The intermediate portion 68 of the pin is slidably positioned in contact within the ring 56 of the locking screw, and the tip end 62 is slidably positioned in contact with the eyelet 48 of the locking plate to thereby define a coupled configuration. When the pin is placed in the coupled configuration, a key-actuated padlock 70 is insertable within the bore of the locking pin for locking the spare tire 20 to a pick-up truck.

In order to access the spare tire, the padlock 70 is removed and the pin 60 is extracted from the eyelet 48 and ring 56. The locking screw 50 is then threadably decoupled from the frame of the pick-up truck. Now, the lower rail of the locking tongue may be pivoted downward for accessing the spare tire of the pick-up truck.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An anti-theft device for a spare tire on a pick-up truck comprising, in combination:

a rigid spare tire locking tongue formed of a planar upper rail having an upper end, a lower end, and a length greater than a thickness of a spare tire of a pickup truck and with the upper end securable to a frame of a pick-up truck, a rigid planar lower rail having an inboard end and an outboard end and a length greater than a diameter of a spare tire of a pickup truck and with the outboard end having a bore disposed thereon and the inboard end coupled to the lower end of the upper rail with a hinge, the hinge allowing the lower rail to be placed in facing contact with a side of a spare tire of a pick-up truck positioned thereabove;

a rigid locking plate having an upper extent with a pair of opposed C-shaped locking arms slidably secured to the lower rail and a lower extent with an eyelet formed thereon;

a rigid locking screw disposed within the bore of the lower rail of the locking tongue, the locking screw having a threaded upper end threadably securable to a frame of a pick-up truck, a lower end with a ring which is fixedly attached thereto and alignable with the eyelet of the locking plate, and a flange formed thereon intermediate the upper and lower ends and positionable in contact with the lower rail of the locking tongue;

a rigid locking pin having a cylindrical tip end with a bore disposed therethrough, a circular planar head end having a diameter greater than the tip end, and an intermediate cylindrical portion therebetween having a diameter greater than the tip end and less than the head end and with the intermediate portion slidably positioned within the ring of the locking screw and the tip end slidably positioned within the eyelet of the locking plate to thereby define a coupled configuration and with a lock insertable within the bore of the locking pin when placed in the coupled configuration for locking the spare tire to a pick-up truck.

2. An anti-theft device for a spare tire of a vehicle comprising:

a rigid locking plate having an upper extent having means for slidable engagement with and movement along the length of a lower rail of a spare tire locking tongue of a vehicle and a lower extent with an eyelet formed thereon;

a rigid locking screw disposable within a bore of a lower rail of a spare tire locking tongue of a vehicle, the locking screw having an upper end securable to a frame of a vehicle and a lower end with a ring which is fixedly attached thereto and alignable with the eyelet of the locking plate; and a rigid locking pin having a bore on one end and a head on the other end and with the pin positionable within the eyelet of the locking plate and ring of the locking screw to thereby define a coupled configuration and with a lock insertable within the bore of the locking pin when placed in the coupled configuration for locking the spare tire to a vehicle.

3. The anti-theft device for a spare tire of a vehicle as set forth in claim 2 wherein the upper extent includes a pair of opposed C-shaped locking arms.

4. The anti-theft device for a spare tire of a vehicle as set forth in claim 2 wherein the locking screw includes a flange formed thereon intermediate the upper and lower ends and with the flange positionable in contact with the lower rail of the locking tongue.

5. The anti-theft device for a spare tire of a vehicle as set forth in claim 2 further including a rigid spare tire locking tongue formed of a planar elongated upper rail having an upper end, a lower end, and a length greater than a thickness of a spare tire and with the upper end securable to a frame of a vehicle, a rigid planar lower rail having an inboard end and an outboard end and a length greater than a diameter of a spare tire of a vehicle and with the outboard end having a bore disposed thereon and the inboard end hingably coupled to the lower end of the upper rail and thereby allowing the lower rail to be placed in facing contact with a side of a spare tire of a vehicle positioned thereabove.

\* \* \* \* \*